Oct. 19, 1948.　　　O. H. HALLER　　　2,451,550
HOLDER
Filed Nov. 14, 1945
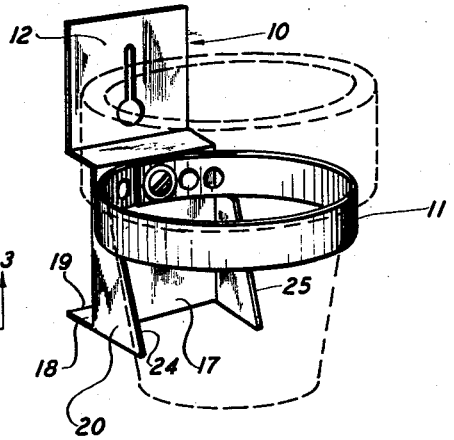
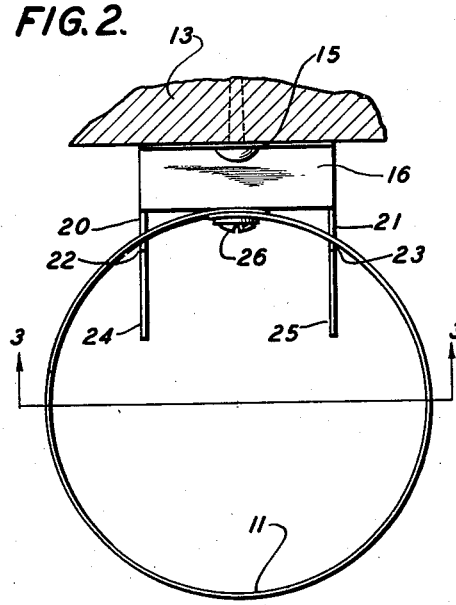
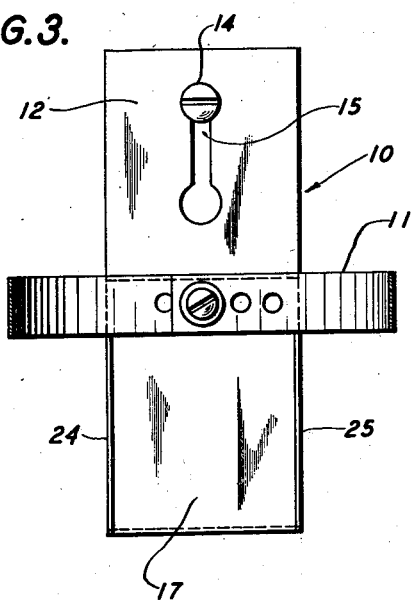
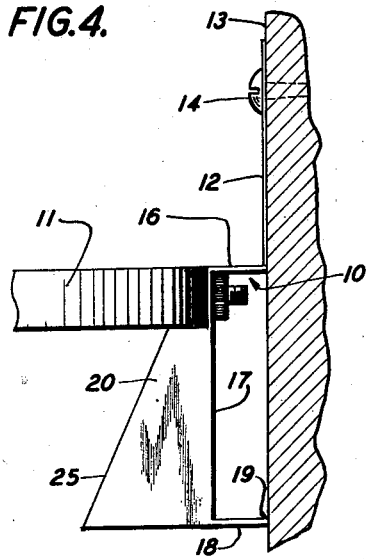
INVENTOR.
OSCAR H. HALLER
BY
Christie & Angus
ATTORNEYS Patented Oct. 19, 1948

2,451,550

UNITED STATES PATENT OFFICE 2,451,550

HOLDER

Oscar H. Haller, Los Angeles, Calif.

Application November 14, 1945, Serial No. 628,496

3 Claims. (Cl. 248—315)

This invention relates to pot-holding devices and more particularly to a holder for flower pots, adapted to support a flower pot on a wall.

The principal object is to provide a simple device adapted to hold the flower pot in an upright position against a wall.

My novel holder is formed with a portion adapted to be fastened against a wall, and is provided with winged brackets and is provided with means for supporting a ring adapted to support the flower pot, and with winged bracket members of a configurtion to engage to the side wall of the pot and hold it in an upright position.

The foregoing and other features of my novel device will be more clearly understood from the following detailed description taken in conjunction with the accompanying drawings of which:

Fig. 1 is a perspective view of a flower pot holder according to my invention;

Fig. 2 is a top view of the pot holder;

Fig. 3 is a front elevation view of the pot holder with a section taken at line 3—3 of Fig. 2; and Fig. 4 is a side elevation view.

Referring to the drawings, there is shown a flower pot holder adapted to be fastened against a vertical wall while holding the flower pot in its proper upright position, at some desired space from the wall. The device comprises two pieces, one of which is bracket piece 10 which may be made of some suitable sheet material; and the other of which is in the form of a ring 11 which may be of a suitable flexible material such as sheet metal and bolted to the bracket.

The bracket member 10 comprises a flat sheet-like upper portion 12 adapted to lie flat against a wall 13, to which it may be held by a suitable fastening device such as a screw 14 through a slot or other suitable opening 15 through member 12. At the lower end of portion 12, the bracket is bent to form a horizontal ledge portion 16 which may be of a convenient width, for example, one-half to one inch depending on the size of the flower pot to be supported and the distance at which it is desired to hold it from the wall.

Depending from the outer edge of ledge 16, the bracket member is bent to form a substantially vertical portion 17 which extends downwardly for a convenient distance which may vary with the size of the flower pot. For a moderately small-sized flower pot, for example, the height of portion 17 may be around two or three inches. At the lower end of depending portion 17, the bracket is provided with a spacer member 18 which may be formed by bending the bracket back toward the wall for a distance which brings the edge 19 even with the plane of portion 12.

Protruding from each side of portion 17 there are provided a pair of wing portions 20 and 21, and these may be formed by bending the same unitary bracket sheet. The two wing portions are provided at their top edges with horizontal ledges 22 and 23 respectively; and each wing member is provided with a spacing edge 24 and 25 respectively which extends obliquely downwardly from the outer end of the respective ledges 22 and 23. These spacing edges are made of a degree of obliqueness depending on the conical angle of the flower pot wall (shown in dotted outline in Fig. 1), such that the flower pot wall rests against these oblique spacing edges and the flower pot is thereby held in the upright position.

The holding ring 11 is provided with a hole at each end through which a supporting bolt 26 may be passed. Preferably, although not necessarily, one or both of the ends of the ring is provided with a number of holes, as shown, to provide for adjustment of the diameter of the ring to different flower pot sizes. The diameter should be such that the ring member fits under the collar of the flower pot, as shown. The lower edge of the ring rests on the two ledges 22 and 23 and the bolt 26 passes through portion 17 of the bracket thereby securely holding the ring.

It will be recognized that by my invention I have provided a simple and effective holding device which is attractive and can readily be adapted to different sizes of flower pots throughout a considerable range of pot sizes.

I claim:

1. A flower-pot holder adapted for holding a flower pot against a wall, comprising a wall member adapted to be affixed to a wall, a wing-holding member, a spacing member extending from the wall member to the top of the wing-holding member and adapted to hold the wing-holding member away from the wall, a second spacing member extending rearwardly from the bottom of the wing-holding member and adapted to abut against the wall, a pair of wings protruding outwardly from each side edge of the wing-holding member, each wing forming a ledge at its upper edge and having an oblique edge slanted downwardly and outwardly, a pot-holding ring resting on the ledges and fastened to the wing-holding member for supporting the flower pot, the oblique edges of the wings being slanted to engage the side wall of the flower pot and hold it in an upright position.

2. A flower-pot holder adapted for holding a flower pot against a wall, comprising a flat wall portion adapted to be affixed against a vertical wall, a vertical wing-holding portion, means for holding the wing-holding portion in its vertical position and spaced from the wall, said means comprising two spacing portions extending from the wing-holding portion to the wall and located substantially at the upper and lower ends of the wing-holding portion, the upper spacing portion being attached to the wall portion, a pot-holding ring fastened at the upper end of the wing-holding portion and adapted to engage beneath the collar of a flower-pot, and a pair of wing members extending outwardly from each side of each wing-holding portion, each of said wing members being provided with a horizontal ledge at the top on which the holding ring rests, and having an oblique edge extending obliquely downwardly from the outer edge of the ledge to engage the side wall of the flower pot and hold it in an upright position.

3. A flower-pot holder adapted for holding a flower pot against a wall, comprising an unitary bracket member adapted to support a pot-holding ring and to hold the pot in an upright position, said bracket comprising at its upper end a flat wall member adapted to be placed and fastened against a wall, a horizontally extending portion at the base of the wall member, a wing-holding portion depending downwardly from the outer edge of the horizontal portion, a second horizontal portion extending rearwardly from the lower edge of the wing-holding portion and adapted to hold the wing-holding portion in spaced relation from the wall, said wing-holding portion having a wing member protruding from each of its lateral edges, each wing having a ledge at its upper end on which the pot-holding ring rests and an oblique edge slanting downwardly and outwardly from the outer ends of the ledges to engage the side wall of the flower pot and thereby hold it in an upright position.

OSCAR H. HALLER.

REFERENCES CITED

The following references are of record in the file of this patent:

UNITED STATES PATENTS

| Number | Name | Date |
|---|---|---|
| 1,743,529 | Challinor | Jan. 14, 1930 |